United States Patent
Morishita et al.

(10) Patent No.: US 11,001,660 B2
(45) Date of Patent: May 11, 2021

(54) CARBON MATERIAL PRECURSOR, CARBON MATERIAL PRECURSOR COMPOSITION CONTAINING THE SAME, AND METHOD FOR PRODUCING CARBON MATERIAL USING THE SAME

(71) Applicant: KABUSHIKI KAISHA TOYOTA CHUO KENKYUSHO, Nagakute (JP)

(72) Inventors: Takuya Morishita, Nagakute (JP); Kenichi Hayashida, Nagakute (JP); Kazuhiro Nomura, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 0 days.

(21) Appl. No.: 16/043,271

(22) Filed: Jul. 24, 2018

(65) Prior Publication Data

US 2019/0031800 A1 Jan. 31, 2019

(30) Foreign Application Priority Data

Jul. 27, 2017 (JP) .............................. JP2017-145668
Apr. 3, 2018 (JP) .............................. JP2018-071641

(51) Int. Cl.
| | | |
|---|---|---|
| *C08F 220/56* | (2006.01) | |
| *C08K 3/32* | (2006.01) | |
| *C08K 3/38* | (2006.01) | |
| *C08J 5/18* | (2006.01) | |
| *C01B 32/05* | (2017.01) | |

(52) U.S. Cl.
CPC ............ *C08F 220/56* (2013.01); *C01B 32/05* (2017.08); *C08J 5/18* (2013.01); *C08K 3/32* (2013.01); *C08K 3/38* (2013.01); *C08F 2800/10* (2013.01); *C08J 2333/26* (2013.01); *C08K 2003/322* (2013.01); *C08K 2003/329* (2013.01)

(58) Field of Classification Search
None
See application file for complete search history.

(56) References Cited

U.S. PATENT DOCUMENTS

| | | | | | |
|---|---|---|---|---|---|
| 5,618,901 | A | * | 4/1997 | Smierciak | ............. C08F 220/44 |
| | | | | | 526/342 |
| 10,385,186 | B2 | * | 8/2019 | Hayashida | ............ C08F 120/56 |
| 2018/0148563 | A1 | * | 5/2018 | Hayashida | ............... C08K 3/30 |

FOREIGN PATENT DOCUMENTS

| | | |
|---|---|---|
| JP | S37-4405 A | 6/1962 |
| JP | 2009-127017 A | 6/2009 |
| JP | 2009-166300 A | 7/2009 |
| JP | 2010-059294 A | 3/2010 |
| JP | 2013-103992 A | 5/2013 |
| JP | 2015-74844 A | 4/2015 |
| JP | 2016-40419 A | 3/2016 |
| JP | 2016-113726 A | 6/2016 |
| JP | 2016-186057 A | 10/2016 |
| JP | 2016-186058 A | 10/2016 |

OTHER PUBLICATIONS

Moskowitz; Polyacrylonitrile Copolymers: Effects of Molecular Weight, Polydispersity, Composition, and Sequencing on Thermal Ring-Closing Stabilization; Dissertations The Aquila Digital Community, University of Southern Mississippi; Dec. 11, 2015.*
Jul. 16, 2020 Office Action issued in Japanese Patent Application No. 2018-071641.

* cited by examiner

*Primary Examiner* — Colin W. Slifka
(74) *Attorney, Agent, or Firm* — Oliff PLC

(57) ABSTRACT

A carbon material precursor includes an acrylamide/vinyl cyanide-based copolymer which contains 50 to 99.9 mol % of acrylamide-based monomer unit and 0.1 to 50 mol % of vinyl cyanide-based monomer unit; a carbon material precursor composition includes the above-described carbon material precursor and at least one additional component selected from the group consisting of acids and salts thereof; and a method for producing a carbon material, includes subjecting the above-described carbon material precursor or the above-described carbon material precursor composition to thermal-stabilization treatment as necessary, followed by carbonization treatment.

13 Claims, No Drawings

CARBON MATERIAL PRECURSOR, CARBON MATERIAL PRECURSOR COMPOSITION CONTAINING THE SAME, AND METHOD FOR PRODUCING CARBON MATERIAL USING THE SAME

BACKGROUND OF THE INVENTION

Field of the Invention

The present invention relates to a carbon material precursor, a carbon material precursor composition containing the same, and a method for producing a carbon material using the same.

Related Background Art

Conventionally employed methods for producing carbon fibers, a type of carbon material, mainly include a method including subjecting a carbon fiber precursor, obtained by spinning polyacrylonitrile, to thermal-stabilization treatment, followed by carbonization treatment (for example, Japanese Examined Patent Application Publication No. Sho 37-4405 (Patent Document 1), Japanese Unexamined Patent Application Publication No. 2015-74844 (Patent Document 2), Japanese Unexamined Patent Application Publication No. 2016-40419 (Patent Document 3), and Japanese Unexamined Patent Application Publication No. 2016-113726 (Patent Document 4)). Since the polyacrylonitrile used in this method is poorly soluble in an inexpensive general purpose solvent, it is necessary to use an expensive solvent such as dimethyl sulfoxide and N,N-dimethylacetamide in polymerization and spinning, which results in a problem that the cost of producing carbon fibers becomes high.

Meanwhile, since polyacrylamide is a water soluble polymer, it is possible to use water, being inexpensive and having low environmental load, as a solvent in polymerization and forming processing (film formation, sheet formation, spinning, and the like). For this reason, polyacrylamide is expected to reduce the cost of producing carbon materials.

In addition, Japanese Unexamined Patent Application Publication No. 2013-103992 (Patent Document 5) describes a carbon material precursor fiber which includes a polyacrylonitrile-based copolymer made up of 96 to 97.5 parts by mass of an acrylonitrile unit, 2.5 to 4 parts by mass of an acrylamide unit, and 0.01 to 0.5 parts by mass of a carboxylic acid-containing vinyl monomer.

SUMMARY OF THE INVENTION

However, a carbon material precursor produced by using polyacrylamide has a problem of a low carbonization yield. In addition, although the polyacrylonitrile-based copolymer described in Patent Document 5 contains an acrylamide unit, the polyacrylonitrile-based copolymer is insoluble in water and thus it is necessary to use an expensive solvent such as N,N-dimethylacetamide in polymerization and forming processing, which results in a problem that the cost of producing carbon fibers becomes high.

The present invention has been made in view of the above problems of the conventional technique and objects thereof are to provide a carbon material precursor which includes an acrylamide-based copolymer and which has a high carbonization yield, a carbon material precursor composition containing the same, and a method for producing a carbon material using the same.

The present inventors have made earnest studies to achieve the objects described above and as a result found that use of an acrylamide/vinyl cyanide-based copolymer containing an acrylamide-based monomer unit and a vinyl cyanide-based monomer unit in a particular ratio makes it possible to obtain a carbon material precursor which has both a high carbonization yield and a solubility to an aqueous solvent or an aqueous mixture solvent. This finding has led to the completion of the present invention.

Specifically, a carbon material precursor of the present invention includes an acrylamide/vinyl cyanide-based copolymer containing 50 to 99.9 mol % of an acrylamide-based monomer unit and 0.1 to 50 mol % of a vinyl cyanide-based monomer unit. In such a carbon material precursor, the acrylamide/vinyl cyanide-based copolymer is preferably soluble in an aqueous solvent or an aqueous mixture solvent. Furthermore, the acrylamide/vinyl cyanide-based copolymer is preferably an acrylamide/acrylonitrile copolymer.

In addition, a carbon material precursor composition of the present invention contains the carbon material precursor of the present invention and at least one additional component selected from the group consisting of acids and salts thereof. In such a carbon material precursor composition, the content of the additional component is preferably 0.1 to 40 parts by mass relative to 100 parts by mass of the carbon material precursor. Furthermore, the additional component is preferably at least one selected from the group consisting of phosphoric acid, polyphosphoric acid, boric acid, polyboric acid, and ammonium salts thereof.

Moreover, a method for producing a carbon material of the present invention includes subjecting the carbon material precursor of the present invention or the carbon material precursor composition of the present invention to carbonization treatment. The carbonization treatment is preferably heat treatment under an inert atmosphere. In addition, in the method for producing a carbon material of the present invention, prior to the carbonization treatment, the carbon material precursor or the carbon material precursor composition is preferably subjected to thermal-stabilization treatment. The thermal-stabilization treatment is preferably heat treatment under an oxidizing atmosphere. Furthermore, the carbonization treatment is preferably heat treatment at a temperature higher than the heating temperature in the thermal-stabilization treatment.

Note that in the present invention, an aqueous solution is a solution containing an aqueous solvent (water, alcohol, and the like, and a mixture solvent thereof) as the solvent, and an aqueous mixture solution is a solution containing an aqueous mixture solvent (mixture solvent of the aqueous solvent and an organic solvent (tetrahydrofuran and the like)) as the solvent. Additionally, the content of the organic solvent in the aqueous mixture solvent is not particularly limited as long as the organic solvent is mixed in such an amount that the acrylamide/vinyl cyanide-based copolymer, which is insoluble or poorly soluble to the aqueous solvent, becomes soluble.

In addition, although it is not exactly clear why the carbon material precursor of the present invention shows a high carbonization yield, the present inventors speculate as follows. Specifically, in the carbon material precursor of the present invention, the presence of the vinyl cyanide-based monomer unit proceeds in the heat treatment cyclization reaction between the acrylamide-based monomer unit and the vinyl cyanide-based monomer unit or cyclization reaction among the vinyl cyanide-based monomer units preferentially over cyclization reaction among the acrylamide-based monomer units. As a consequence, a rigid cyclic structure is introduced into the polymer chain, which improves heat resistance. Additionally, such a cyclic structure suppresses successive thermal decomposition beginning at the end of the polymer chain, which improves thermal stability. Therefore, the carbonization yield is improved. Furthermore, in the carbon material precursor composition of the present invention, the cyclic structure is formed when an acid or a salt thereof being an additional component functions as a catalyst in the dehydration reaction among the acrylamide-based monomer units. Here, the structure of the acrylamide/vinyl cyanide-based copolymer is converted into a structure with a high heat resistance. Therefore, the carbonization yield of the carbon material precursor is further improved.

The present invention makes it possible to obtain a carbon material precursor which includes an acrylamide-based copolymer and which has a high carbonization yield. Also, use of such a carbon material precursor of the present invention makes it possible to efficiently produce carbon materials by use of a low-cost and safe aqueous solvent or aqueous mixture solvent.

DETAILED DESCRIPTION OF THE PREFERRED EMBODIMENTS

Hereinafter, the present invention is described in detail based on its preferred embodiments.

[Carbon Material Precursor]

First, a carbon material precursor of the present invention is described. The carbon material precursor of the present invention includes an acrylamide/vinyl cyanide-based copolymer containing 50 to 99.9 mol % of an acrylamide-based monomer unit and 0.1 to 50 mol % of a vinyl cyanide-based monomer unit.

(Acrylamide/Vinyl Cyanide-Based Copolymer)

The acrylamide/vinyl cyanide-based copolymer used in the present invention contains an acrylamide-based monomer unit in a ratio of 50 to 99.9 mol % and a vinyl cyanide-based monomer unit in a ratio of 0.1 to 50 mol % relative to 100 mol % of a total monomer unit. Such an acrylamide/vinyl cyanide-based copolymer is soluble in an aqueous solvent or an aqueous mixture solvent. Meanwhile, if the ratio of the acrylamide-based monomer unit decreases below the lower limit (if the vinyl cyanide-based monomer unit exceeds the upper limit), the acrylamide/vinyl cyanide-based copolymer is insoluble in an aqueous solvent or an aqueous mixture solvent. On the other hand, if the ratio of the acrylamide-based monomer unit exceeds the upper limit (if the vinyl cyanide-based monomer unit decreases below the lower limit), it is impossible to obtain a carbon material precursor having a high carbonization yield. Moreover, from the viewpoint of solubility of the copolymer to an aqueous solvent or an aqueous mixture solvent, the lower limit of the content of the acrylamide-based monomer unit is preferably 60 mol % or more and more preferably 70 mol % or more, and the upper limit of the content of the vinyl cyanide-based monomer unit is preferably 40 mol % or less and more preferably 30 mol % or less. In addition, from the viewpoint that the carbonization yield of the carbon material precursor is improved, the upper limit of the content of the acrylamide-based monomer unit is preferably 99 mol % or less, more preferably 97 mol % or less, further preferably 95 mol % or less, and particularly preferably 90 mol % or less, and the lower limit of the content of the vinyl cyanide-based monomer unit is preferably 1 mol % or more, more preferably 3 mol % or more, further preferably 5 mol % or more, and particularly preferably 10 mol % or more.

The acrylamide-based monomer includes, for example, acrylamide; N-alkylacrylamides such as N-methylacrylamide, N-ethylacrylamide, N-n-propylacrylamide, N-isopropylacrylamide, N-n-butylacrylamide, and N-tert-butylacrylamide; N-cycloalkylacrylamides such as N-cyclohexylacrylamide; dialkylacrylamides such as N,N-dimethylacrylamide; dialkylaminoalkylacrylamides such as dimethylaminoethylacrylamide and dimethylaminopropylacrylamide; hydroxyalkylacrylamides such as N-(hydroxymethyl)acrylamide and N-(hydroxyethyl)acrylamide; N-arylacrylamides such as N-phenylacrylamide; diacetone acrylamide; N,N'-alkylenebisacrylamides such as N,N'-methylenebisacrylamide; methacrylamide; N-alkylmethacrylamides such as N-methylmethacrylamide, N-ethylmethacrylamide, N-n-propylmethacrylamide, N-isopropylmethacrylamide, N-n-butylmethacrylamide, and N-tert-butylmethacrylamide; N-cycloalkylmethacrylamides such as N-cyclohexylmethacrylamide; dialkylmethacrylamides such as N,N-dimethylmethacrylamide; dialkylaminoalkylmethacrylamides such as dimethylaminoethylmethacrylamide and dimethylaminopropylmethacrylamide; hydroxyalkylmethacrylamides such as N-(hydroxymethyl)methacrylamide and N-(hydroxyethyl)methacrylamide; N-arylmethacrylamides such as N-phenylmethacrylamide; diacetone methacrylamide; and N,N'-alkylenebismethacrylamides such as N,N'-methylenebismethacrylamide. These acrylamide-based monomers may be used singly or in combination of two or more kinds. Additionally, among these acrylamide-based monomers, acrylamide; dialkylacrylamides, methacrylamide, and dialkylmethacrylamides are preferable and acrylamide is particularly preferable from the viewpoint of high solubility to an aqueous solvent or an aqueous mixture solvent.

The vinyl cyanide-based monomer includes, for example, acrylonitrile, methacrylonitrile, 2-hydroxyethylacrylonitrile, chloroacrylonitriles, chloromethacrylonitriles, methoxyacrylonitriles, and methoxymethacrylonitriles. These vinyl cyanide-based monomers may be used singly or in combination of two or more kinds. Additionally, among these vinyl cyanide-based monomers, acrylonitrile is preferable from the viewpoint that the carbonization yield of the carbon material precursor is improved.

In addition, the acrylamide/vinyl cyanide-based copolymer used in the present invention may contain different polymerizable monomer units other than the acrylamide-based monomer unit and the vinyl cyanide-based monomer unit as long as the effects of the present invention are not impaired. The content of these different polymerizable monomer units is preferably 49.9 mol % or less, more preferably 40 mol % or less, and further preferably 30 mol % or less relative to the total monomer unit of the acrylamide/vinyl cyanide-based copolymer. The different polymerizable monomers include unsaturated carboxylic acids such as acrylic acid, methacrylic acid, and itaconic acid and salts thereof; unsaturated carboxylic anhydrides such as maleic anhydride and itaconic anhydride; unsaturated carboxylic acid esters such as methyl acrylate and methyl methacrylate; vinyl-based monomers such as styrene, α-methylstyrene, vinyl chloride, and vinyl alcohol; and olefin-based monomers such as ethylene and propylene.

Known polymerization methods can be employed as a method for producing the carbon material precursor of the present invention which includes such an acrylamide/vinyl cyanide-based copolymer, including solution polymerization, suspension polymerization, precipitation polymerization, dispersion polymerization, emulsion polymerization (for example, inverse emulsion polymerization), and the like. In the case of employing the solution polymerization, the solvent is not particularly limited as long as it dissolves the raw material monomer and the acrylamide/vinyl cyanide-based copolymer to be obtained. From the viewpoint of safe production at a low cost, it is preferable to use the aqueous solvent (water, alcohol, and the like, and a mixture solvent thereof and the like) or the aqueous mixture solvent (mixture solvent of the aqueous solvent and an organic solvent (tetrahydrofuran and the like)), more preferable to use the aqueous solvent, and particularly preferable to use water. In addition, it is possible to use conventionally known polymerization initiators as the polymerization initiator. In the case of using the aqueous solvent or the aqueous mixture solvent as the solvent, it is preferable to employ a radical polymerization initiator which is soluble in the aqueous solvent or the aqueous mixture solvent (preferably the aqueous solvent and more preferably water) such as 4,4'-azobis(4-cyanovaleric acid), ammonium persulfate, and potassium persulfate.

[Carbon Material Precursor Composition]

Next, a carbon material precursor composition of the present invention is described. The carbon material precursor composition of the present invention contains the carbon material precursor of the present invention and at least one additional component selected from the group consisting of acids and salts thereof. When at least one additional component selected from the group consisting of acids and salts thereof is added to the carbon material precursor of the present invention, the carbonization yield is further improved.

In the carbon material precursor composition of the present invention, the content of such an additional component is preferably 0.1 to 40 parts by mass, more preferably 0.1 to 30 parts by mass, further preferably 0.2 to 25 parts by mass, and particularly preferably 0.3 to 20 parts by mass relative to 100 parts by mass of the carbon material precursor from the viewpoint that the carbonization yield is more improved.

The acids include inorganic acids such as phosphoric acid, polyphosphoric acid, boric acid, polyboric acid, sulfuric acid, nitric acid, carbonic acid, and hydrochloric acid and organic acids such as oxalic acid, citric acid, sulfonic acid, and acetic acid. Additionally, the salts of these acids include metal salts (for example, sodium salts and potassium salts), ammonium salts, amine salts, and the like. Ammonium salts and amine salts are preferable and ammonium salts are more preferable. Among these additional components in particular, from the viewpoint that the carbonization yield of the carbon material precursor to be obtained is further improved, phosphoric acid, polyphosphoric acid, boric acid, polyboric acid, sulfuric acid, and ammonium salts thereof are preferable, phosphoric acid, polyphosphoric acid, boric acid, polyboric acid, and ammonium salts thereof are more preferable, and phosphoric acid, polyphosphoric acid, and ammonium salts thereof are particularly preferable.

It is possible to employ methods for producing such a carbon material precursor composition of the present invention, including e.g. a method of directly blending the carbon material precursor in the molten state with the additional component (melt blending), a method of dry blending the carbon material precursor and the additional component together (dry blending), a method of immersing or passing the carbon material precursor formed into a desired shape (for example, film shape, sheet shape, and fiber shape) through an aqueous solution or an aqueous mixture solution containing the additional component or through a solution in which the carbon material precursor is incompletely dissolved but the additional component is completely dissolved. A preferable method is a method of blending the carbon material precursor and the additional component together in the aqueous solvent or the aqueous mixture solvent (wet blending) from the viewpoints that the carbon material precursor and the additional component to be used are soluble in the aqueous solvent or the aqueous mixture solvent and that it is possible to homogeneously blend the carbon material precursor and the additional component. Furthermore, in the case where the above-described polymerization is carried out in the aqueous solvent or in the aqueous mixture solvent in production of the carbon material precursor, it is possible to employ, as the wet blending, a method of blending the additional component e.g. after the polymerization. Moreover, the carbon material precursor composition of the present invention is collected by removing the solvent from the obtained solution and then can be used for the production of the carbon material to be described later. Besides, without removing the solvent, the obtained solution can be used directly for the production of the carbon material to be described later. In addition, in the wet blending, the solvent used is preferably the aqueous solvent and more preferably water from the viewpoint that the carbon material precursor composition can safely be produced at a lower cost. Furthermore, the method of removing the solvent is not particularly limited. It is possible to employ at least one of the known methods of vacuum distillation, reprecipitation, hot air drying, vacuum drying, freeze drying, and the like.

[Method for Producing Carbon Material]

Next, a method for producing the carbon material of the present invention is described. As the method for producing the carbon material of the present invention, although carbonization treatment can directly be carried out on the carbon material precursor of the present invention or on the carbon material precursor composition of the present invention, it is preferable that thermal-stabilization treatment (flameproofing treatment) be carried out and then carbonization treatment be carried out.

A preferable method for producing the carbon material of the present invention includes first carrying out heat treatment (thermal-stabilization treatment) on the carbon material precursor or on the carbon material precursor composition of the present invention under an oxidizing atmosphere (for example, in the air). This proceeds cyclization reaction between the acrylamide-based monomer unit and the vinyl cyanide-based monomer unit or cyclization reaction among the vinyl cyanide-based monomer units. Here, the structure of the acrylamide/vinyl cyanide-based copolymer constituting the carbon material precursor is converted into a structure with a high heat resistance. Therefore, the carbonization yield of the carbon material precursor is improved. Particularly in the carbon material precursor composition, catalytic action of an acid or a salt thereof being an additional component accelerates dehydration reaction among the acrylamide-based monomer units, which makes it likely that the cyclic structure is formed and the structure of the acrylamide/vinyl cyanide-based copolymer is converted into a structure with a high heat resistance. Therefore, the carbonization yield of the carbon material precursor is further improved. The heating temperature in such thermal-stabilization treatment is preferably 500° C. or less. From the viewpoint that efficient conversion into a structure with a high heat resistance takes place and the carbonization treatment improves the carbonization yield, the heating temperature is more preferably 150 to 450° C., further preferably 200 to 400° C., particularly preferably 300 to 400° C., and most preferably 310 to 400° C. Also, the heating time in the thermal-stabilization treatment is not particularly limited, and heating for a long period of time is possible (for example, more than 1 hour). From the viewpoint of cost reduction, however, the heating time is preferably 1 to 60 minutes.

Next, the carbon material precursor (thermally-stabilized carbon material precursor) or the carbon material precursor composition (thermally-stabilized carbon material precursor composition), which has been subjected to thermal-stabilization treatment as described above, is subjected to heat treatment (carbonization treatment) under an inert atmosphere (in an inert gas such as nitrogen, argon, and helium) at a temperature higher than the heating temperature in the above-described thermal-stabilization treatment. This carbonizes the thermally-stabilized carbon material precursor, making it possible to obtain the desired carbon material. The heating temperature in such carbonization treatment is preferably 500° C. or more and more preferably 1000° C. or more. Meanwhile, the upper limit of the heating temperature is preferably 3000° C. or less and more preferably 2000° C. or less. Moreover, the heating time in the carbonization treatment, although not particularly limited, is preferably 1 to 60 minutes and more preferably 1 to 30 minutes. Additionally, multiple-stage heat treatment can be carried out in the carbonization treatment: for example, heat treatment is first carried out at a temperature less than 1000° C. and then heat treatment is carried out at a temperature of 1000° C. or more. Note that, the method for producing the carbon material of the present invention may include carrying out such carbonization treatment directly on the carbon material precursor or the carbon material precursor composition of the present invention without carrying out the above-described thermal-stabilization treatment.

In addition, in the method for producing the carbon material of the present invention, the carbon material precursor or carbon material precursor composition to be used is preferably subjected to forming process into a desired shape (for example, film shape, sheet shape, and fiber shape) in advance before the thermal-stabilization treatment (before the carbonization treatment in the case where the thermal-stabilization treatment is not carried out). Here, the carbon material precursor or the carbon material precursor composition may directly be pressed, or melt molding (for example, melt cast molding, melt extrusion molding, injection molding, melt spinning, spunbonding, melt blowing, and centrifugal spinning) may be carried out by using the carbon material precursor or the carbon material precursor composition in the molten state. From the viewpoint that the carbon material precursor or the carbon material precursor composition of the present invention is soluble in the aqueous solvent or the aqueous mixture solvent and thus the forming processability is improved, forming is preferably carried out by dissolving the carbon material precursor or the carbon material precursor composition in the aqueous solvent or the aqueous mixture solvent and then using the obtained aqueous solution or aqueous mixture solution. Alternatively, forming is preferably carried out after the solution of the carbon material precursor polymerized as described above or the solution of the carbon material precursor composition obtained in the above-described wet blending is simply used or adjusted to a desired concentration. As the above forming method, it is preferable to carry out solution casting, wet molding, dry spinning, wet spinning, dry-wet spinning, gel spinning, flash spinning, or electrospinning. This makes it possible to safely produce a carbon material precursor or a carbon material precursor composition of a desired shape at a low cost. Additionally, from the viewpoint that the carbon material can be produced safely and at a lower cost, it is more preferable to use the aqueous solvent and particularly preferable to use water as the solvent. As described above, use of a carbon material precursor or a carbon material precursor composition subjected to forming process into a desired shape in advance makes it possible to produce a carbon material of a desired shape (for example, carbon film, carbon sheet, and carbon fiber).

EXAMPLES

Hereinafter, the present invention is described in further detail based on Examples and Comparative Examples. However, the present invention is not limited to Examples below. Note that the composition of the acrylamide/vinyl cyanide copolymer was measured by the method below.

<$^{13}$C-NMR Measurement>

An acrylamide/vinyl cyanide-based copolymer was dissolved in heavy water (dissolved in deuterated dimethyl sulfoxide if insoluble in heavy water). For the obtained solution, $^{13}$C-NMR measurement was carried out under the conditions of room temperature and a frequency of 100 MHz. Observation of a $^{13}$C-NMR spectrum obtained shows a peak originating from the carbon atom of the cyano group of the vinyl cyanide-based monomer unit at a position of about 121 ppm to about 122 ppm and a peak originating from the carbon atom of the carbonyl group of the acrylamide-based monomer unit at a position of about 177 ppm to about 182 ppm. In consideration of the above, the ratio between the integrated intensities of these peaks in the obtained $^{13}$C-NMR spectrum was calculated. This integrated intensity ratio was used to determine the ratio between the acrylamide-based monomer unit and the vinyl cyanide-based monomer unit in the acrylamide/vinyl cyanide-based copolymer.

Moreover, the acrylamide/vinyl cyanide copolymers used in Examples and Comparative Examples were synthesized in the following methods.

Synthesis Example 1

Into 480 ml of ion-exchanged water, 96.0 g (1.35 mol) of acrylamide (AAm, manufactured by Wako Pure Chemical Industries, Ltd.) and 23.9 g (0.45 mol) of acrylonitrile (AN) were dissolved. To the obtained aqueous solution, 4.11 g of ammonium persulfate and 6.75 ml of tetramethylethylenediamine were added, followed by polymerization reaction under a nitrogen atmosphere at 50° C. for 3 hours. The obtained aqueous solution was introduced into methanol to precipitate a copolymer, which was collected and vacuum-dried. Thus, an acrylamide/acrylonitrile copolymer (AAm/AN) was obtained. The composition ratio of this AAm/AN copolymer was determined to be acrylamide unit/acrylonitrile unit (AAm/AN)=75 mol %/25 mol %.

Synthesis Example 2

The acrylamide/acrylonitrile copolymer (AAm/AN) was obtained in the same manner as Synthetic Example 1 except that the amount of acrylamide (AAm) was changed to 89.6 g (1.26 mol), the amount of acrylonitrile (AN) was changed to 28.7 g (0.54 mol), and polymerization temperature was changed to 70° C. The composition ratio of this AAm/AN copolymer was determined to be acrylamide unit/acrylonitrile unit (AAm/AN)=70 mol %/30 mol %.

Synthesis Example 3

The acrylamide/acrylonitrile copolymer (AAm/AN) was obtained in the same manner as Synthetic Example 1 except that the amount of acrylamide (AAm) was changed to 108.8 g (1.53 mol), the amount of acrylonitrile (AN) was changed to 14.3 g (0.27 mol), and polymerization temperature was changed to 70° C. The composition ratio of this AAm/AN copolymer was determined to be acrylamide unit/acrylonitrile unit (AAm/AN)=85 mol %/15 mol %.

Synthesis Example 4

The acrylamide/acrylonitrile copolymer (AAm/AN) was obtained in the same manner as Synthetic Example 1 except that the amount of acrylamide (AAm) was changed to 115.2 g (1.62 mol), the amount of acrylonitrile (AN) was changed to 9.56 g (0.18 mol), and polymerization temperature was changed to 70° C. The composition ratio of this AAm/AN copolymer was determined to be acrylamide unit/acrylonitrile unit (AAm/AN)=90 mol %/10 mol %.

Synthesis Example 5

The acrylamide/acrylonitrile copolymer (AAm/AN) was obtained in the same manner as Synthetic Example 1 except that the amount of acrylamide (AAm) was changed to 63.33 g (0.89 mol), the amount of acrylonitrile (AN) was changed to 0.475 g (0.0090 mol), the amount of ion-exchanged water was changed to 900 ml, the amount of ammonium persulfate was changed to 1.26 g, the amount of tetramethylethylenediamine was changed to 6.75 ml, and polymerization temperature was changed to 75° C. The composition ratio of this AAm/AN copolymer was determined to be acrylamide unit/acrylonitrile unit (AAm/AN)=99 mol %/1 mol %.

Comparative Synthesis Example 1

When the polymerization reaction was carried out in the same manner as Synthetic Example 1 except that the amount of acrylamide (AAm) was changed to 51.2 g (0.72 mol) and the amount of acrylonitrile (AN) was changed to 57.3 g (1.08 mol), the generated acrylamide/acrylonitrile copolymer (AAm/AN) did not dissolve into water but precipitated. For this reason, purification by use of methanol was difficult. Note that the composition ratio of the AAm/AN copolymer was determined to be acrylamide unit/acrylonitrile unit (AAm/AN)=40 mol %/60 mol %.

Example 1

As the carbon material precursor, the AAm/AN copolymer (AAm/AN=75 mol %/25 mol %) obtained in Synthetic Example 1 was used as it was.

Example 2

As the carbon material precursor, the AAm/AN copolymer (AAm/AN=75 mol %/25 mol %) obtained in Synthetic Example 1 was dissolved in ion-exchanged water such that the concentration of the carbon material precursor was adjusted to 20% by mass. To the obtained aqueous solution, 2 parts by mass of diammonium hydrogenphosphate was added and completely dissolved relative to 100 parts by mass of the carbon material precursor. Water in the obtained aqueous solution was subjected to vacuum distillation, and then the obtained solid component was subjected to vacuum drying. Thus, a carbon material precursor composition containing the AAm/AN copolymer and diammonium hydrogenphosphate was obtained.

Example 3

A carbon material precursor composition containing the AAm/AN copolymer and diammonium hydrogenphosphate was obtained in the same manner as Example 2 except that the amount of diammonium hydrogenphosphate added was changed to 3 parts by mass relative to 100 parts by mass of the carbon material precursor.

Example 4

A carbon material precursor composition containing the AAm/AN copolymer and diammonium hydrogenphosphate was obtained in the same manner as Example 2 except that the amount of diammonium hydrogenphosphate added was changed to 20 parts by mass relative to 100 parts by mass of the carbon material precursor.

Example 5

A carbon material precursor composition containing the AAm/AN copolymer and phosphoric acid was obtained in the same manner as Example 2 except that 2 parts by mass of phosphoric acid in place of diammonium hydrogenphosphate was added relative to 100 parts by mass of the carbon material precursor.

Example 6

A carbon material precursor composition containing the AAm/AN copolymer and boric acid was obtained in the same manner as Example 2 except that 2 parts by mass of boric acid in place of diammonium hydrogenphosphate was added relative to 100 parts by mass of the carbon material precursor.

Example 7

As the carbon material precursor, the AAm/AN copolymer (AAm/AN=70 mol %/30 mol %) obtained in Synthetic Example 2 was used as it was.

Example 8

A carbon material precursor composition containing the AAm/AN copolymer and diammonium hydrogenphosphate was obtained in the same manner as Example 2 except that the AAm/AN copolymer (AAm/AN=70 mol %/30 mol %) obtained in Synthetic Example 2 was used as the carbon material precursor and the amount of diammonium hydrogenphosphate added was changed to 3 parts by mass relative to 100 parts by mass of the carbon material precursor.

Example 9

As the carbon material precursor, the AAm/AN copolymer (AAm/AN=85 mol %/15 mol %) obtained in Synthetic Example 3 was used as it was.

Example 10

A carbon material precursor composition containing the AAm/AN copolymer and diammonium hydrogenphosphate was obtained in the same manner as Example 2 except that the AAm/AN copolymer (AAm/AN=85 mol %/15 mol %) obtained in Synthetic Example 3 was used as the carbon material precursor and the amount of diammonium hydrogenphosphate added was changed to 3 parts by mass relative to 100 parts by mass of the carbon material precursor.

Example 11

As the carbon material precursor, the AAm/AN copolymer (AAm/AN=90 mol %/10 mol %) obtained in Synthetic Example 4 was used as it was.

Example 12

As the carbon material precursor, the AAm/AN copolymer (AAm/AN=99 mol %/1 mol %) obtained in Synthetic Example 5 was used as it was.

Comparative Example 1

A 10%-aqueous solution of polyacrylamide (manufactured by Tokyo Chemical Industry Co., Ltd., product code: A0140) was subjected to vacuum drying to remove water. Thus, polyacrylamide (PAAm) was collected. This PAAm was used as the carbon material precursor as it was.

Comparative Example 2

As the carbon material precursor, the AAm/AN copolymer (AAm/AN=40 mol %/60 mol %) obtained in Comparative Synthetic Example 1 was used as it was.

<Measurement of Carbonization Yield>

Vacuum drying was carried out on 3 mg of each of the carbon material precursors (Examples 1, 7, 9, 11, and 12 and Comparative Example 1) and the carbon material precursor compositions (Examples 2 to 6, 8, and 10) obtained in Examples and Comparative Examples at 80° C. for 12 hours. After that, the resultant was heated from room temperature to 1000° C. at a rate of temperature rise of 20° C./min under a nitrogen stream having a flow rate of 500 ml/min by using a differential thermal balance ("TG 8120" manufactured by Rigaku Corporation). Taking into consideration the effects of water adsorbed to the carbon material precursor after the vacuum drying, the carbonization yields of the carbon material precursor at 500° C. and 1000° C. with reference to the mass of the carbon material precursor at 150° C. were calculated using the following formula:

$$\text{Carbonization yield}[\%] = M_T / M_{150} \times 100$$

[$M_T$: mass of the carbon material precursor at temperature T (500° C. or 1000° C.), $M_{150}$: mass of the carbon material precursor at 150° C.]

Table 1 shows the results. Note that the carbonization yield was not measured for the carbon material precursor obtained in Comparative Example 2 because purification by methanol was difficult in Comparative Synthetic Example 2.

<Measurement of Solubility to Water>

Each of the carbon material precursors (Examples 1, 7, 9, 11, and 12 and Comparative Examples 1 and 2) and the carbon material precursor compositions (Example 2 to 6, 8, and 10) obtained in Examples and Comparative Examples was added to ion-exchanged water such that the concentration of carbon material precursor was adjusted to 10% by mass. Then, the resultant was stirred with a stirrer at room temperature for 24 hours. After that, observation was carried out on the solubility of the carbon material precursor to water. Table 1 shows the results.

TABLE 1

| | Carbon material precursor | Additional component | | Carbonization yield [%] | | Solubility to water |
| --- | --- | --- | --- | --- | --- | --- |
| | | Type | Addd amount*[1] | 500° C. | 1000° C. | |
| Ex. 1 | AAm/AN = 75/25 | — | — | 27.8 | 23.7 | Soluble |
| Ex. 2 | AAm/AN = 75/25 | Diammonium hydrogenphosphate | 2 | 42.9 | 35.1 | Soluble |
| Ex. 3 | AAm/AN = 75/25 | Diammonium hydrogenphosphate | 3 | 46.5 | 40.4 | Soluble |
| Ex. 4 | AAm/AN = 75/25 | Diammonium hydrogenphosphate | 20 | 60.4 | 42.5 | Soluble |
| Ex. 5 | AAm/AN = 75/25 | Phosphoric acid | 2 | 43.8 | 35.3 | Soluble |
| Ex. 6 | AAm/AN = 75/25 | Boric acid | 2 | 32.1 | 26.8 | Soluble |
| Ex. 7 | AAm/AN = 70/30 | — | — | 25.9 | 24.7 | Soluble |
| Ex. 8 | AAm/AN = 70/30 | Diammonium hydrogenphosphate | 3 | 48.1 | 42.4 | Soluble |
| Ex. 9 | AAm/AN = 85/15 | — | — | 23.6 | 21.2 | Soluble |
| Ex. 10 | AAm/AN = 85/15 | Diammonium hydrogenphosphate | 3 | 45.7 | 36.7 | Soluble |
| Ex. 11 | AAm/AN = 90/10 | — | — | 23.2 | 21.2 | Soluble |
| Ex. 12 | AAm/AN = 99/1 | — | — | 22.5 | 21.0 | Soluble |
| Comp. Ex. 1 | PAAm | — | — | 19.3 | 15.9 | Soluble |
| Comp. Ex. 2 | AAm/AN = 40/60 | — | — | — | — | Insoluble |

*[1]Added amount [parts by mass] relative to 100 parts by mass of carbon material precursor As shown in Table 1, it was demonstrated that the carbon material precursors (Example 1, 7, 9, 11, and 12) and the carbon material precursor compositions (Example 2 to 6, 8, and 10) of the present invention, which were composed of an acrylamide/vinyl cyanide-based copolymer having the mole ratio between the acrylamide-based monomer unit and the vinyl cyanide-based monomer unit within a predetermined range, were water soluble and that their carbonization yields were higher for both the heating temperatures 500° C. and 1000° C. compared to the carbon material precursor composed of polyacrylamide not containing the vinyl cyanide-based monomer unit (Comparative Example 1). On the other hand, it was demonstrated that the carbon material precursor (Comparative Example 2), which was composed of an acrylamide/vinyl cyanide-based copolymer having the ratio of the acrylamide-based monomer unit smaller than a predetermined range, was water insoluble.

Moreover, as is apparent from the comparison between Examples 2 to 6 and Example 1, between Example 8 and Example 7, and between Example 10 and Example 9, it was revealed that the carbonization yield increased to a greater extent for carbon material precursor compositions (Examples 2 to 6, 8, and 10), in which a predetermined amount of phosphoric acid, boric acid, or a phosphate was added to the carbon material precursor composed of an acrylamide/vinyl cyanide-based copolymer, compared to the cases where a phosphate was not added (Examples 1, 7, and 9). Furthermore, it was revealed that the carbonization yield increased to a greater extent in the cases where phosphoric acid or a phosphate was added (Examples 2 and 5) compared to the case where boric acid was added (Example 6).

Production Example 1

The carbon material precursor obtained in Example 1 was dissolved in ion-exchanged water such that the concentration was adjusted to 30% by mass. The obtained aqueous solution was cast onto a Petri dish, followed by evaporation of water. Thus, a film made of carbon material precursor was formed. This film had an even thickness and an excellent surface appearance.

The thus-obtained film made of carbon material precursor was subjected to heat treatment (thermal-stabilization treatment) under an air atmosphere at 350° C. for 10 min. Thus, a film made of thermally-stabilized carbon material precursor was obtained. This film made of thermally-stabilized carbon material precursor was subjected to heat treatment (carbonization treatment) under a nitrogen atmosphere at 1000° C. for 10 min. Thus, a film made of carbon material was obtained.

Production Example 2

The carbon material precursor composition obtained in Example 2 was dissolved in ion-exchanged water such that the concentration of the carbon material precursor was adjusted to 30% by mass. Thus, an aqueous solution was prepared. A film made of carbon material precursor composition was obtained in the same manner as Production Example 1 except that this aqueous solution was used. This film had an even thickness and an excellent surface appearance. Thermal-stabilization treatment and carbonization treatment were carried out in the same manner as Production Example 1 except that the thus-obtained film made of carbon material precursor composition was used. Thus, a film made of carbon material was obtained.

As described above, the present invention makes it possible to obtain a carbon material precursor which includes an acrylamide-based copolymer and which has a high carbonization yield.

Since the carbon material precursor used is soluble in an aqueous solvent or an aqueous mixture solvent and has a high carbonization yield, the method for producing a carbon material of the present invention is therefore useful as a method which makes it possible to efficiently produce carbon materials by use of a low-cost and safe aqueous solvent or aqueous mixture solvent.

What is claimed is:
1. A carbon material precursor comprising:
an acrylamide/vinyl cyanide-based copolymer which contains
60 to 99.9 mol % of an acrylamide-based monomer unit and
0.1 to 40 mol % of a vinyl cyanide-based monomer unit,
wherein the acrylamide/vinyl cyanide-based copolymer is soluble in an aqueous solvent.
2. The carbon material precursor according to claim 1, wherein
the acrylamide/vinyl cyanide-based copolymer is an acrylamide/acrylonitrile copolymer.
3. The carbon material precursor according to claim 1, wherein
the acrylamide-based monomer unit is at least one monomer unit selected from the group consisting of acrylamide, dialkylacrylamides, methacrylamide, and dialkylmethacrylamides.
4. The carbon material precursor according to claim 1, wherein
the acrylamide/vinyl cyanide-based copolymer contains
70 to 99.9 mol % of the acrylamide-based monomer unit and
0.1 to 30 mol % of the vinyl cyanide-based monomer unit.
5. The carbon material precursor according to claim 1, wherein
the acrylamide/vinyl cyanide-based copolymer contains
75 to 99.9 mol % of the acrylamide-based monomer unit and
0.1 to 25 mol % of the vinyl cyanide-based monomer unit.
6. A carbon material precursor composition comprising:
the carbon material precursor according to claim 1 and
at least one additional component selected from the group consisting of acids and salts thereof.
7. The carbon material precursor composition according to claim 6, wherein
a content of the additional component is 0.1 to 40 parts by mass relative to 100 parts by mass of the carbon material precursor.
8. The carbon material precursor composition according to claim 6, wherein
the additional component is at least one selected from the group consisting of phosphoric acid, polyphosphoric acid, boric acid, polyboric acid, and ammonium salts thereof.
9. A method for producing a carbon material, comprising:
subjecting the carbon material precursor according to claim 1 or the carbon material precursor composition comprising the carbon material precursor and at least one additional component selected from the group consisting of acids and salts thereof to carbonization treatment.
10. The method for producing a carbon material according to claim 9, wherein
the carbonization treatment is heat treatment under an inert atmosphere.
11. The method for producing a carbon material according to claim 9, further comprising:
prior to the carbonization treatment, subjecting the carbon material precursor or the carbon material precursor composition to thermal-stabilization treatment.
12. The method for producing a carbon material according to claim 11, wherein
the thermal-stabilization treatment is heat treatment under an oxidizing atmosphere.
13. The method for producing a carbon material according to claim 11, wherein the carbonization treatment is heat treatment at a temperature higher than the heating temperature in the thermal-stabilization treatment.

\* \* \* \* \*